(12) United States Patent
McCann et al.

(10) Patent No.: US 7,234,785 B1
(45) Date of Patent: Jun. 26, 2007

(54) PARKING-BRAKING IN VEHICLES HAVING AN ELECTRONIC BRAKING SYSTEM

(75) Inventors: Denis John McCann, South Wales (GB); Andrew John Ward, South Wales (GB)

(73) Assignee: ArvinMeritor, Inc., Troy, MI (US)

( * ) Notice: Subject to any disclaimer, the term of this patent is extended or adjusted under 35 U.S.C. 154(b) by 0 days.

(21) Appl. No.: 09/647,112

(22) PCT Filed: Mar. 26, 1999

(86) PCT No.: PCT/GB99/00953

§ 371 (c)(1),
(2), (4) Date: Nov. 15, 2000

(87) PCT Pub. No.: WO99/48738

PCT Pub. Date: Sep. 30, 1999

(30) Foreign Application Priority Data

Mar. 26, 1998 (GB) .................................. 9806544.4
Oct. 24, 1998 (GB) .................................. 9823202.8

(51) Int. Cl.
*B60T 17/16* (2006.01)
(52) U.S. Cl. .............................. 303/89; 303/3; 303/20; 188/265; 188/72.9
(58) Field of Classification Search ................ 188/265, 188/72.6, 72.7, 72.9, 156, 158; 303/89, 3, 303/20
See application file for complete search history.

(56) References Cited

U.S. PATENT DOCUMENTS

| 3,690,417 | A | * | 9/1972 | Airheart ..................... 188/71.8 |
| 3,874,747 | A | * | 4/1975 | Case et al. ..................... 303/89 |
| 4,175,646 | A |   | 11/1979 | Eikelberger |
| 4,412,458 | A | * | 11/1983 | Derringer ..................... 74/512 |
| 4,567,967 | A | * | 2/1986 | Crossman ..................... 188/265 |
| 4,873,824 | A | * | 10/1989 | Cox ............................ 188/265 |
| 4,942,949 | A | * | 7/1990 | Dai ............................. 188/265 |
| 5,078,456 | A | * | 1/1992 | Cox ............................. 303/89 |
| 5,127,495 | A |   | 7/1992 | Verner et al. ............ 188/106 F |
| 5,161,650 | A |   | 11/1992 | Taig |

(Continued)

FOREIGN PATENT DOCUMENTS

DE 4327759 3/1995

(Continued)

*Primary Examiner*—Thomas Williams
(74) *Attorney, Agent, or Firm*—Carlson, Gaskey & Olds

(57) ABSTRACT

A parking braking system for a vehicle uses an electronic braking system (EBS) as a primary source for generating a parking brake force via pneumatic brake actuators. Each pneumatic actuator actuates a piston that is adapted to rotate a pivoted lever, which moves to apply brake pads against a brake disc. The parking braking system includes a hand control that controls actuation of the pneumatic brake actuators. Vehicle brakes for non-parking braking purposes are controlled by electronic signals generated in response to a driver's foot-generated braking demand. An electronic controller is adapted to control a supply of pressurized air to the pneumatic brake actuators in accordance with the driver's braking demand. When parking braking is selected by actuation of the hand control, the vehicle brakes are applied and mechanically locked into place with a stop device that engages the pivoted lever to hold the respective vehicle brake in a parking braking condition, irrespective of whether a brake force generated by the EBS is subsequently reduced.

26 Claims, 12 Drawing Sheets

ACTUATOR EXHAUSTED
PARK HELD

U.S. PATENT DOCUMENTS

| | | | | |
|---|---|---|---|---|
| 5,547,048 A | * | 8/1996 | Anthony | 188/72.9 |
| 5,558,411 A | * | 9/1996 | Kanjo et al. | 303/89 |
| 5,971,110 A | * | 10/1999 | Martin | 188/158 |
| 6,305,511 B1 | * | 10/2001 | McCann et al. | 188/265 |

FOREIGN PATENT DOCUMENTS

| | | |
|---|---|---|
| DE | 19620344 | 8/1997 |
| DE | 19705105 | 8/1997 |
| DE | 19653541 | 6/1998 |
| DE | 19738877 | 9/1998 |
| WO | WO 9938738 | 8/1999 |
| WO | WO 9948738 | 9/1999 |

* cited by examiner

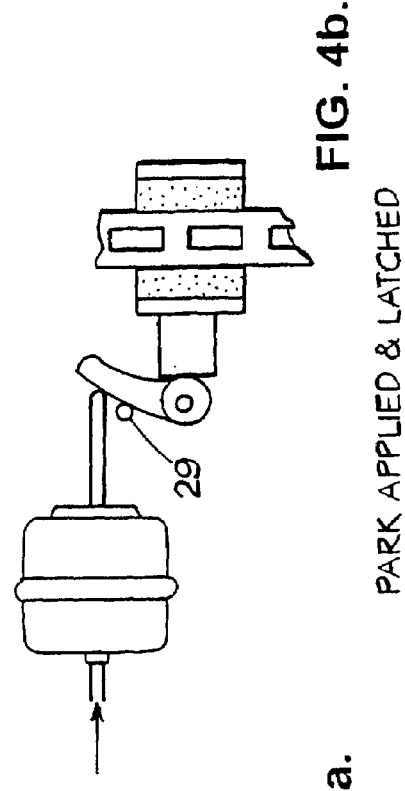
FIG. 4a. RELEASED
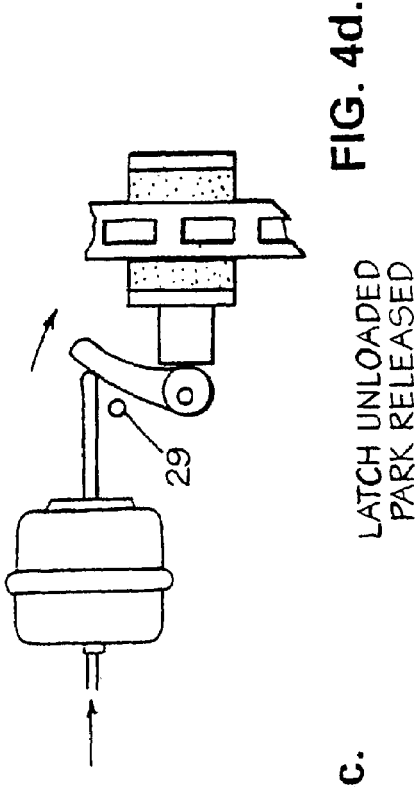
FIG. 4b. PARK APPLIED & LATCHED
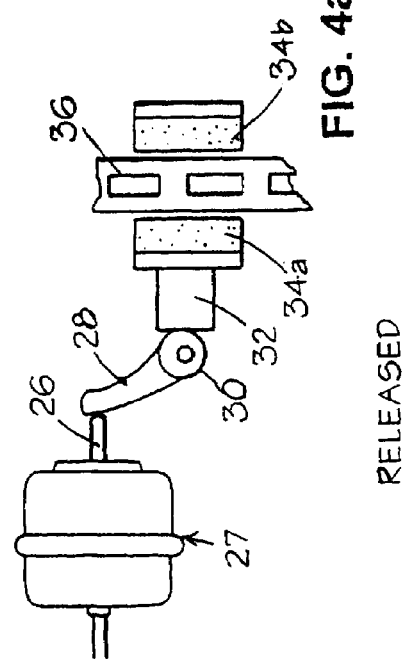
FIG. 4c. ACTUATOR EXHAUSTED PARK HELD
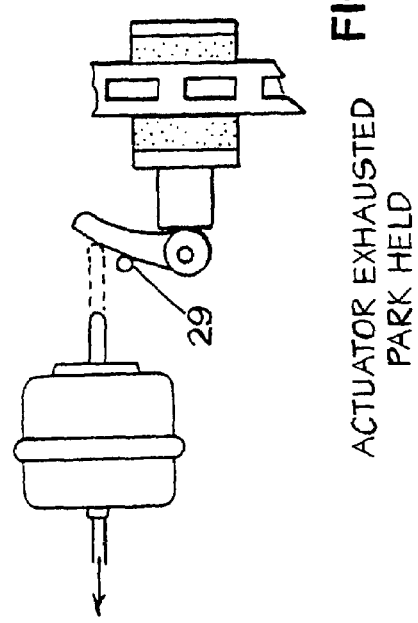
FIG. 4d. LATCH UNLOADED PARK RELEASED

PARKING-BRAKING IN VEHICLES HAVING AN ELECTRONIC BRAKING SYSTEM

RELATED APPLICATIONS

This application claims priority to PCT/GB99/00953, which claims priority to Great Britain Application No. 9806544.4 and 9823202.8.

BACKGROUND OF THE INVENTION

The present invention relates to parking braking systems for vehicles having Electronic Braking Systems (EBS).

With the advent of EBS (see for example EP Patent 0205277), there has been a step change in the way that braking is controlled and distributed on heavy commercial vehicles. However, except in some specific areas such as continuous pad wear sensing, the brakes themselves have yet to take advantage of this change.

The conventional approach to parking brakes in vehicles fitted with EBS uses spring brake actuators 12 as shown diagrammatically in FIG. 1 of the accompanying drawings. In this system, a hand-operated valve 10 is used, via a relay valve 11, to allow a parking brake to be applied. The hand-operated valve 10 operates on an inverse air principle in that the hand-operated valve 10 is arranged to release air pressure to allow the spring force of respective spring brake actuators 12 at each wheel to be applied. A suitable parking brake reservoir 14 is required to store the pressurized air for use within the system. Where the system is used with a vehicle having a trailer, a separate relay valve (not shown) is required to allow selective operation of trailer brakes. When the driver operates the hand-operated valve 10, an inverse pneumatic signal is produced, i.e. the pressure output from the hand-operated valve 10 falls with increasing demand. This causes the spring brake actuators 12 to be applied since, in the normal running mode (no braking) the spring brakes are held off by compressed air.

As evident from FIG. 1, the layout and construction of the conventional parking brake system requires the use of bulky spring actuators 12, a parking reservoir 14 and associated pipework. All of these components require fitting and service which all adds to labor and material costs for OEMs and end users.

The present invention seeks to make better use of the facilities afforded with EBS to enable an improved parking brake system.

U.S. Pat. No. 5,127,495 discloses an electrically powered parking braking system that includes a hydraulic drum brake having two brake shoes which are movable outwardly relative to a friction surface of a drum, and an activation device for generating an activation-force to move the shoes outwardly to a first position into contact with the drum sufficiently to prevent the drum from rotating. This system also includes a solenoid activated linkage mechanism for maintaining the shoes substantially in the first position. Operation of the hydraulic drum brake is achieved via a proportional controller using electrical signals generated in response to brake master cylinder pressure or brake pedal effort.

SUMMARY OF THE INVENTION

In accordance with the present invention there is provided a parking braking system for a vehicle having EBS that utilizes the EBS as a primary means of generating the parking braking force via pneumatic brake actuators, under the control of a manually operated electrical device. Control of vehicle brakes for non-parking braking is achieved by the use of electronic signals generated at a foot-controlled brake pedal in response to a driver's braking demand. Each pneumatic brake actuator has a piston which, for operating a respective brake, is adapted to rotate a pivoted lever so as to urge a displaceable brake piston to apply a pair of brake pads to opposite sides of a respective brake disc. An electronic controller is adapted to control a supply of pressurized air to the pneumatic brake actuators in accordance with the electronic signals corresponding to the driver's braking demand. Upon selecting parking braking by actuation of the manually operated electrical device, the brakes are arranged to be applied and mechanically locked or latched into place with a stop device. When actuated, the stop device is selectively displaceable by an actuator to engage with the pivoted lever to mechanically hold the brake in a selected parking braking condition, irrespective of whether the brake force generated via the EBS is then reduced.

By providing such a mechanical latch or lock, the braking force applied to the brake actuators can be released/removed once the latch or lock has been actuated to hold the brakes in the brakes-applied condition.

In some other embodiments, the manually operated electrical device is adapted to generate and transmit an electrical parking brake signal to a vehicle mounted electronic control unit (ECU). The vehicle brakes are arranged to be mechanically locked or latched via the vehicle mounted ECU in a brakes-applied condition in response to generation of the electrical parking brake signal.

In some embodiments, the vehicle mounted ECU is a main vehicle EBS ECU.

In some other embodiments, the vehicle-mounted ECU is separate from the main vehicle EBS ECU.

In some embodiments, the manually operated electrical device comprises a switch.

In some other embodiments, the manually operated electrical device comprises a variable transducer. The variable transducer can be adapted to enable graduated braking to be provided between the brakes-off and park positions.

Preferably, the brake actuators are arranged to be released via the EBS once the latch or lock has been actuated to hold the brakes in the brakes-applied condition.

Advantageously, following actuation of the manually operable electrical device, the initiation of latching action is provided by a feedback quantity, taken from a sensed actuation level being exerted in the brake, reaching a preset or controlled level.

In some embodiments, the feedback quantity is a pressure developed inside the brake actuator against internal brake forces being developed within the brake.

In some other embodiments, the feedback quantity is a displacement of a component within a brake actuation mechanism. In still further embodiments, the feedback quantity is a force developed inside the brake, measured by a sensor or sensors positioned to be subjected to the actuation/clamping stresses within the brake.

In some embodiments, the stop device is a solenoid operated pin.

In some other embodiments, the stop device comprises a pivotable latch which is selectively rotatable by an actuator for single position engagement with an operating or input lever or shaft of the brake to maintain the brake in the parking braking condition.

Preferably, the stop device is constructed to be capable of mechanically holding the brakes in any of a range of park load levels.

In some embodiments, the stop device comprises a pivotable latch which is selectively rotatable by an actuator to any of a plurality of engagement positions with an operating or input lever or shaft of the brake to maintain the brake in a selected parking braking condition.

In still other embodiments, the stop device comprises a rotatable cam which engages an operating or input lever or shaft of the brake for maintaining the brake in a selected parking braking condition.

In still other embodiments, the stop device comprises a wedge which is arranged to be selectively driven by a controlled actuator into engagement with an operating or input lever or shaft of the brake to maintain the brake in a selected parking braking condition.

Preferably, the controlled actuator is an air cylinder or an electric motor.

Advantageously, the wedge is coupled to the electric motor by way of a mechanism which is non-reversible except by reverse driving of the motor.

Advantageously, the non-reversible mechanism is a high reduction gearbox.

Preferably, in order to enable parking braking to be released, the EBS is arranged to re-apply the brake force up to a level at which a brake latch or lock can be released.

In some embodiments as described above, following selection of a parking braking release condition of the manually operated electrical device, initiation of release of the latching action is arranged to be dependent upon the aforementioned feedback quantity.

By using parking braking systems in accordance with the present invention, it is possible to emulate the principal features of conventional pneumatically controlled spring brakes, including the ability to modulate the amount of braking.

Using a single point latch arrangement which clamps the parking brake at a fixed position cannot take account of the variance in such brake condition tolerances as brake running clearance, new or worn linings and lining compressibility, without the possibility of oversetting the clamp load. A system in accordance with embodiments of the present invention having a variable park latch arrangement, can seek to overcome this problem by determining the level at which the park brake should be latched, driving the brake to a prescribed level using the EBS actuation system and then locking the brake at the desired level.

Particularly, although not exclusively, with embodiments using a cam or wedge, the present system has the ability to enable different park load levels to be accommodated through the use of the variable latch mechanism.

Even with the additional components required within the system, the use of the invention can enable a valuable reduction in the complexity of the parking system which gives both component and installation cost benefits.

The invention is described further hereinafter, by way of example only, with reference to the accompanying drawings, in which:—

BRIEF DESCRIPTION OF THE DRAWINGS

FIG. 4 is a set of diagrams (a-d) illustrating an embodiment of a parking brake system in accordance with the present invention;

DETAILED DESCRIPTION OF THE PREFERRED EMBODIMENT

Figure 1:
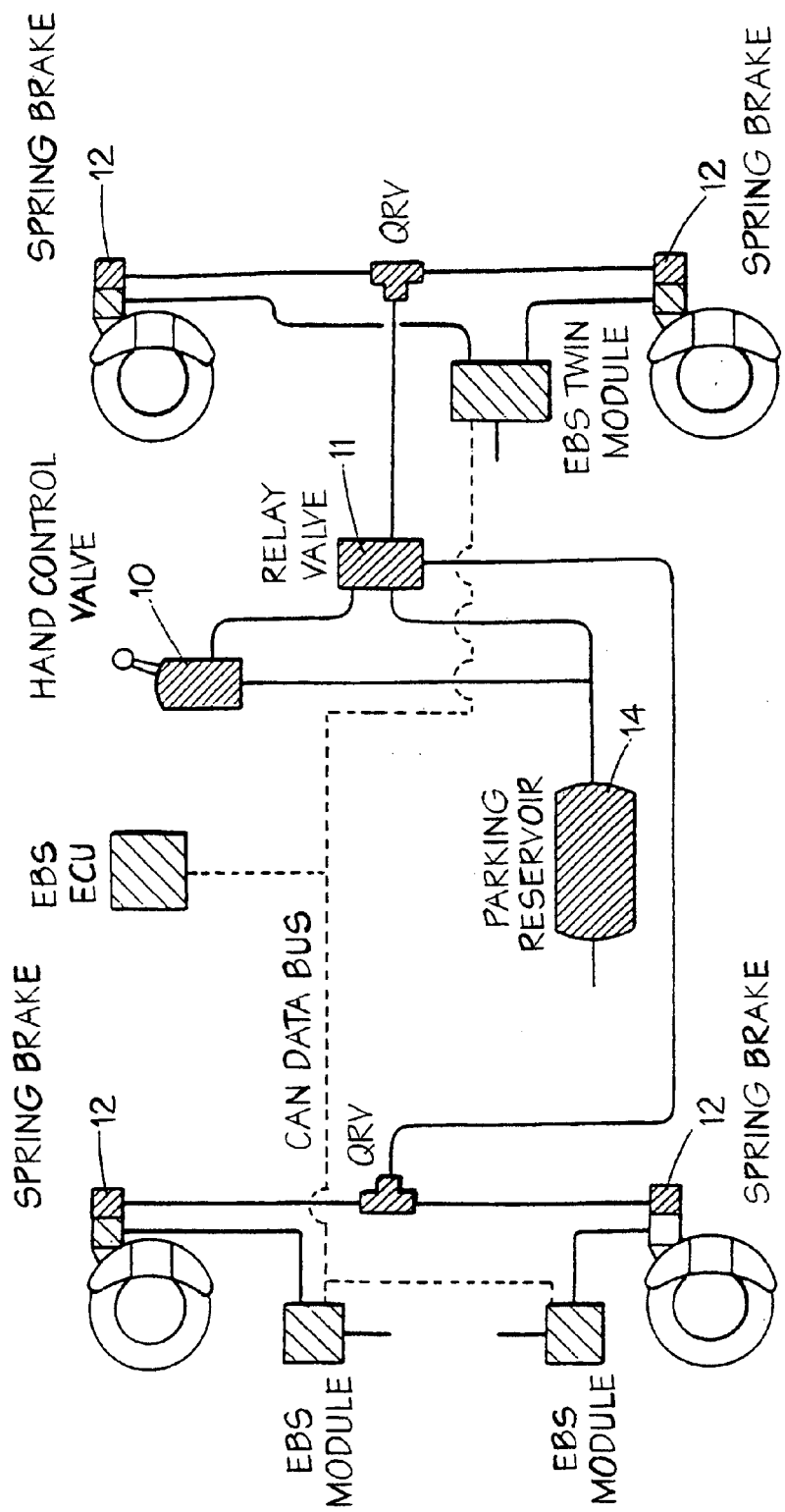
FIG. 1 is a diagrammatic illustration of an example of a conventional parking brake system in an EBS.
Figure 2:
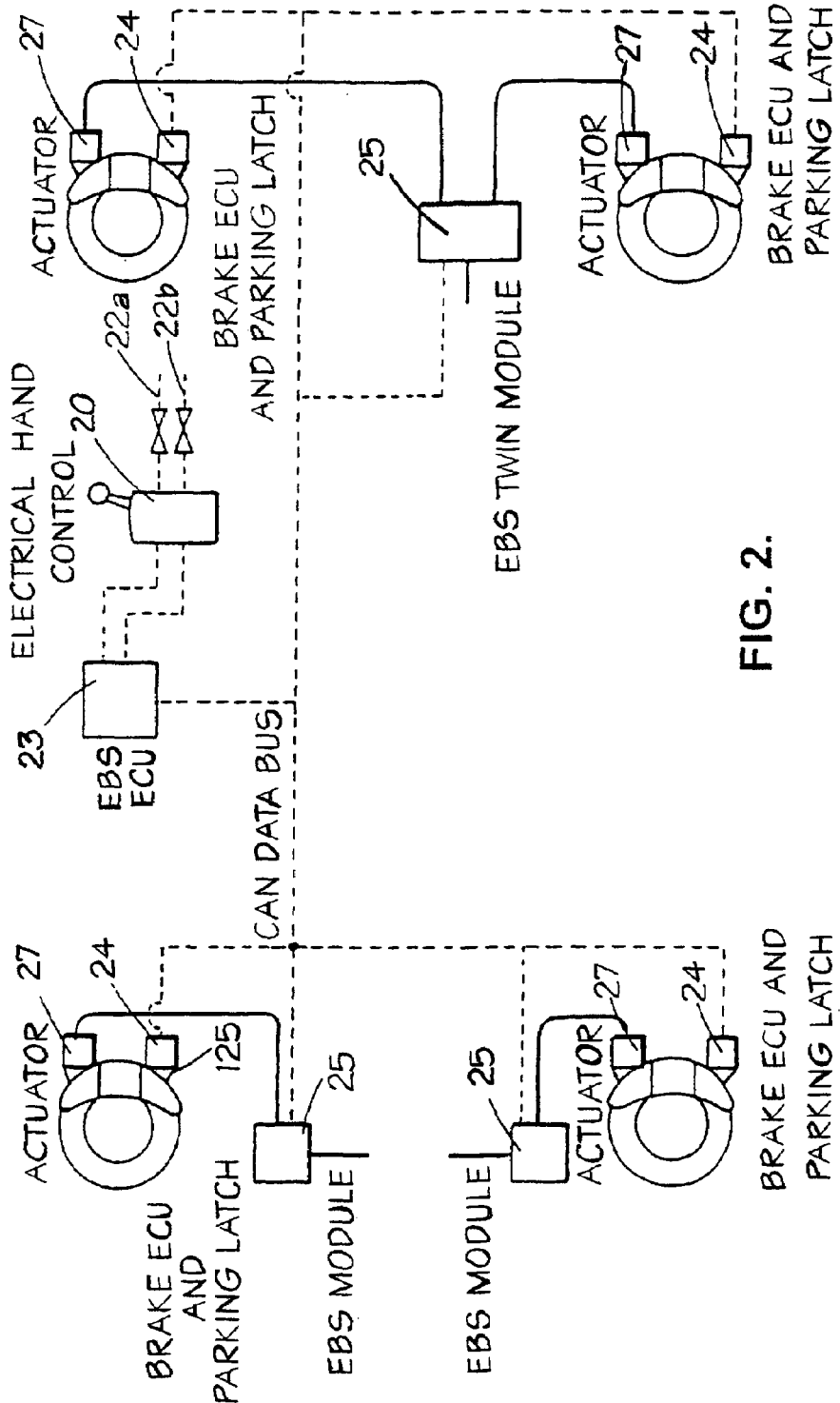
FIG. 2 is a diagrammatic illustration of an EBS incorporating one embodiment of a parking brake system in accordance with the present invention.

Referring now to FIG. 2 there is shown schematically an EBS applied to a vehicle having four braked wheels, two at the front and two at the rear. The forward wheels (on the left in FIG. 2) and rearward wheels (on the right) have brake actuators 27 which are selectively operated for normal braking by control signals generated electrically via a foot controlled transducer (not shown) and manipulated via the vehicle EBS. As indicated schematically in FIG. 2, the system also includes parking latching mechanisms 24 and local brake ECUs 125.

The system of FIG. 2 includes a hand control 20 containing two demand sensors which are preferably transducers, such as potentiometers, powered by individual fused lines 22*a*, 22*b*, fed from a single source (not shown) such as a vehicle battery. The use of transducers enables the parking braking to be modulated via a vehicle EBS ECU 23 and EBS module 25 and has a "park" position into which the hand control 20 is arranged to be latched. Individual power wires, sensors and signal wires are used to provide redundancy, should a bad connection or other fault develop in one of the channels.

Parking latching mechanisms 24 are installed in each wheel brake. These parking latching mechanisms 24 are used to latch the brakes in a clamped condition when the hand control 20 is moved to the park position. In principle, the parking latching mechanisms 24 can be electrically or electro-pneumatically operated.

Figure 3:
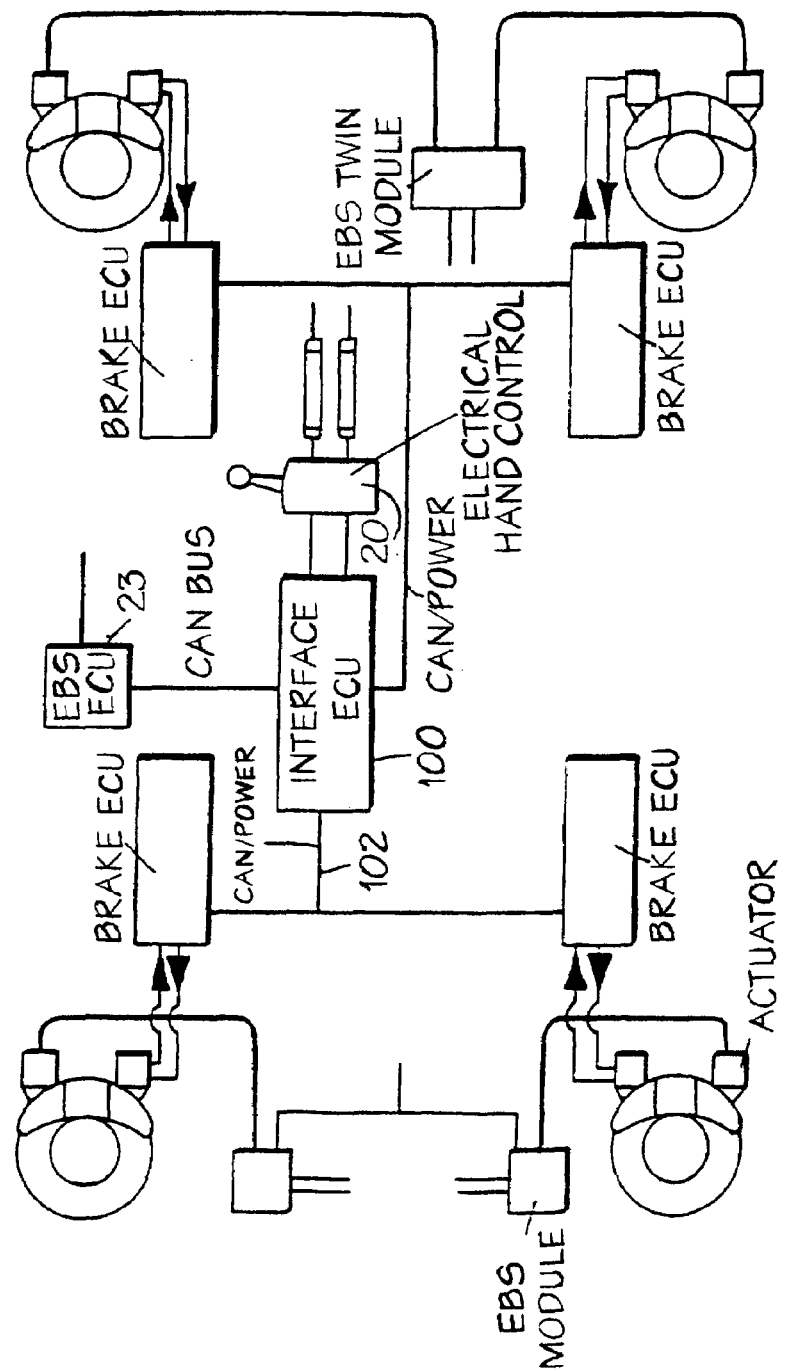
FIG. 3 is a diagrammatic illustration of an EBS incorporating another embodiment of a parking brake system in accordance with the present invention.

FIG. 3 shows a modified system which differs from that of FIG. 2 in that instead of using the EBS ECU 23, the control of the parking latching mechanisms 24 in accordance with signals from the electrical hand control 20 is performed by a separate ECU 100 which connects with respective local brake ECUs via CAN/POWER lines 102.

FIGS. 4*a*-4*d* show one possible way of manifesting the parking latching mechanisms 24 using a solenoid operated pin 29. In this embodiment, each wheel brake actuator 27 includes a pneumatically operated piston 26 which, when any kind of braking (normal braking or parking braking) is demanded, rotates a pivoted lever 28 (referred usually as the operating shaft or op shaft) clockwise (as viewed in FIGS. 4a-4d) to correspondingly rotate a cam 30 to urge a brake piston 32 in a direction to the right and apply brake pads 34a, 34b to the two sides of a brake disc 36. Release of the pneumatically operated piston 26 in a direction to the left allows the pivoted lever 28 to be returned counter-clockwise by a spring (not shown) to release the brake pads 34a, 34b. In the event that parking braking is demanded by operation of the hand control 20, and the pivoted lever 28 has been rotated clockwise to a parking braking level, the parking latching mechanism in the form of the solenoid controlled pin 29 is arranged to bring the solenoid pin 29 into a position behind the pivoted lever 28, as shown in FIG. 4b, where the solenoid operated pin 29 prevents the pivoted lever 28 from returning counter-clockwise when the pneumatic brake actuator 27 is exhausted (FIG. 4c). The parking brake is thereby held on until the hand control 20 is operated to release the parking brake, at which time the pivoted lever 28 is moved slightly clockwise to a level, which is usually (but not necessarily) at least and possibly slightly more than the load that was required to park the brake, to release the contact pressure with the solenoid operated pin 29 and the solenoid operated pin 29 is arranged to be withdrawn to enable normal foot braking to be resumed. In some circumstances, the level can be less than the level that was required to park the brake, for example after thermal contraction of the braking components.

The brakes may have the local brake ECU 125 installed, connected to the local EBS module 25 over a data bus. This local brake ECU 125 would contain drivers for the parking latching mechanism 24. If this local brake ECU 125 is not present, it is possible to control the parking latching mechanism 24 through direct wiring to the EBS module 25 or to another vehicle mounted ECU.

To ensure that the integrity of the system is maintained, the parking function is preferably provided on at least two vehicle axles that are each controlled by discrete parts of the braking system, such as the front and rear circuits in a vertically split system.

The hand control 20 works as a demand sensor, much the same as that installed in an EBS foot controlled valve. In practice, the logic would preferably be arranged such that whichever channel sets the higher demand would win. When the hand control 20 is moved to the park position, the brakes are actuated to a parking level pressure, that is sufficient to provide the parking brake forces necessary to at least meet the requirements of the braking regulations. Once the parking latching mechanism 24 is in place, the EBS releases the braking pressure.

If one half of the EBS has failed, preventing the brakes from being actuated, then parking would remain in operation on the other half.

Figure 15:
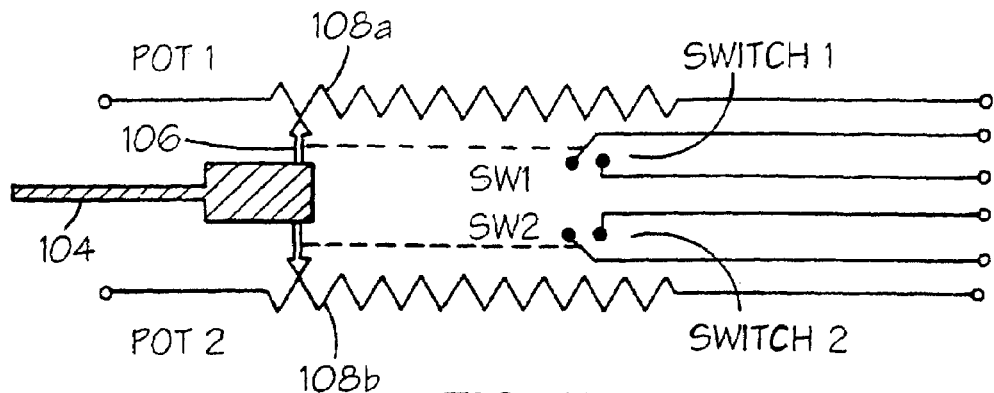
FIG. 15 illustrates diagrammatically an embodiment of a manually operated electrical device for use in the invention.
Figure 16:
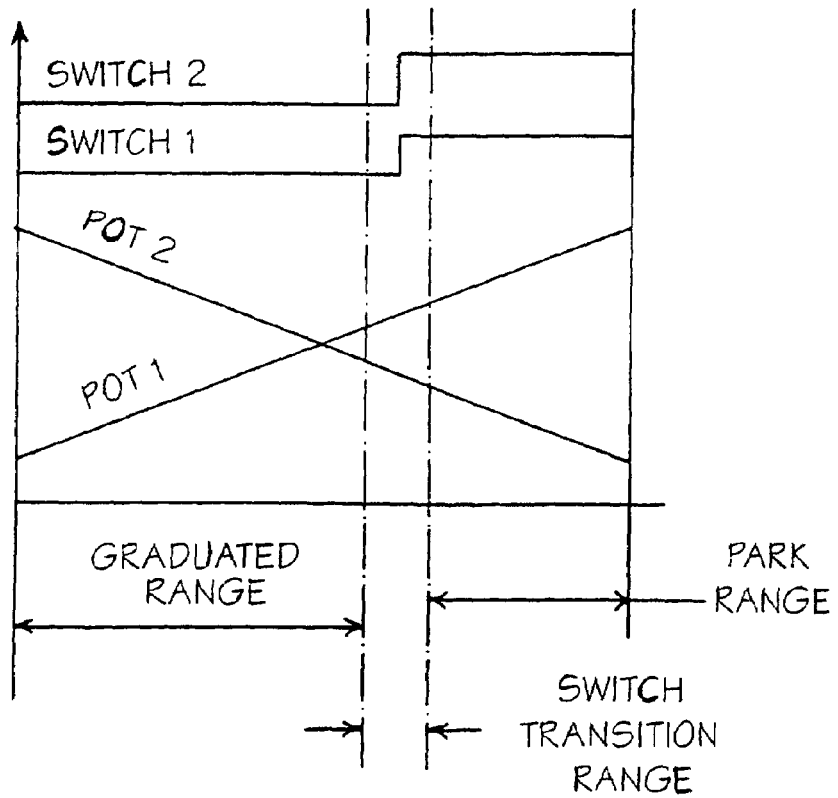
FIG. 16. is a diagram illustrating the operation of the electrical device of FIG. 15.

Referring now to FIGS. 15 and 16, there is shown diagrammatically in FIG. 15 one possible embodiment of the hand control 20. This comprises a hand-operated lever 104, displacement of which correspondingly displaces a ganged slider 106 over two potentiometer tracks 108a, 108b from a "brakes" off position at the left-hand end to a "parking brake on" position adjacent the right-hand end. When the ganged slider 106 reaches the "parking brake on" position, the ganged slider 106 operates a pair of switches SW1 and SW2 which provide electrical signals for use in initiating the operation of the parking latching mechanisms 124. The electrical operation of the hand control 20 of FIG. 15 is illustrated in FIG. 16.

Up to the point where the switches SW1, SW2 are operated, the potentiometer tracks 108a, 108b enable the provision of gradual application of the foundation brakes via the EBS system.

Figure 5:
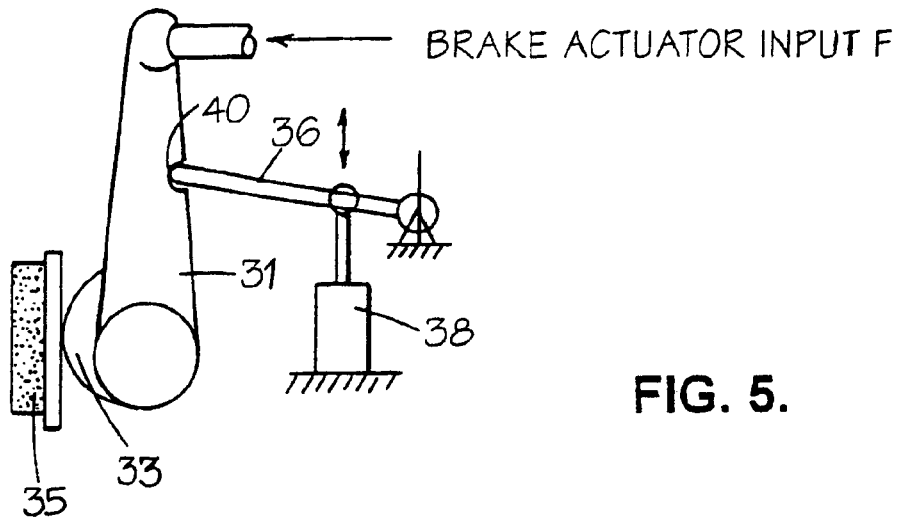
FIG. 5 is a diagrammatic illustration on a non-variable position park latch device.

FIG. 5 shows another embodiment using a non-variable latch wherein a brake actuator input force F rotates a lever 31 (op shaft) carrying a cam 33 for urging a brake pad 35 against a brake disc for normal, non-parking braking purposes. In order to enable the brakes to be retained in a brakes-applied condition for parking braking, a pivotable latch pin 36 can be rotated by an actuator 38 so as to engage in a recess 40 in the lever 31. This provides a latch that can hold the brakes in a set position but cannot accommodate variations in the required park load.

Figure 6:
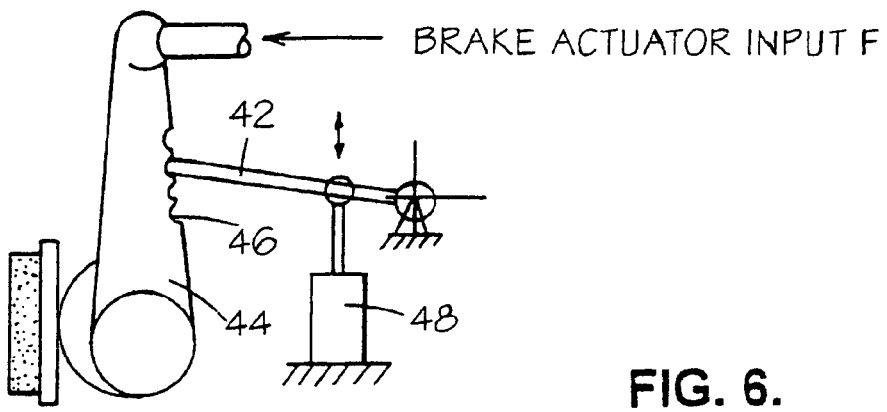
FIGS. 6 and 7 are diagrammatic illustrations of first and second variable position park latch devices in accordance with the present invention.

FIG. 6 shows a development of the arrangement of FIG. 5 wherein a variable position park latch mechanism is provided. The device of FIG. 6 comprises a multi-point latch system that has the ability to set the park load at any one of a number of predetermined park load levels via multipositional mechanical engagement of a solenoid or other linear actuator driven latch pin 42 driven into and out of engagement with an operating member 44 of a brake. For this purpose, the operating member 44 has a number of recesses 46, selectively engageable by the pivoted latch pin 42 whose angular position is determinable by an actuator 48.

In operation of the embodiment of FIG. 4, in the event that parking braking is demanded by operation of the hand control 20 (FIG. 2 or FIG. 3) and the lever or operating member 44 has been rotated counter-clockwise as viewed in FIG. 6 to a parking braking condition, the latching mechanism, in the form of the latch pin 42, is arranged to be displaced counter-clockwise by the actuator 48 to bring the latch pin 42 into a position behind the operating member 44 where it engages one of the recesses 46 to prevent the operating member 44 from returning clockwise when the pneumatic brake actuator 27 is exhausted. The parking brake is thereby held on until the hand control 20 is operated to release the parking brake, at which time the operating member 44 is moved slightly counter-clockwise to a level usually at least and possibly slightly more than the load that was required to park the brake to release the contact pressure with the latch pin 42. The latch pin 42 is arranged to be displaced to enable normal foot braking to be resumed.

Figure 7:
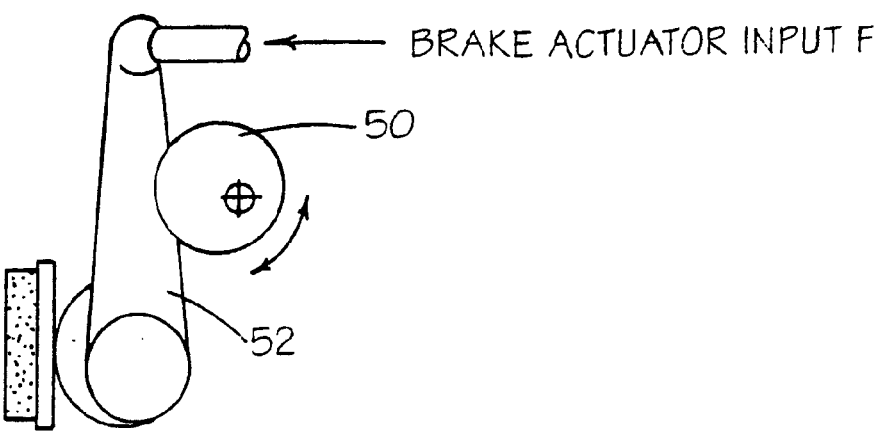

FIG. 7 shows a further development where the surface of a cam member 50 provides a variable backstop for an operating member 52 of the brake. The cam member 50 is driven rotationally by a motor and/or gearbox (not shown). The feature of being able to latch at a variable park load improves over the fixed levels of FIG. 5.

Figure 8:
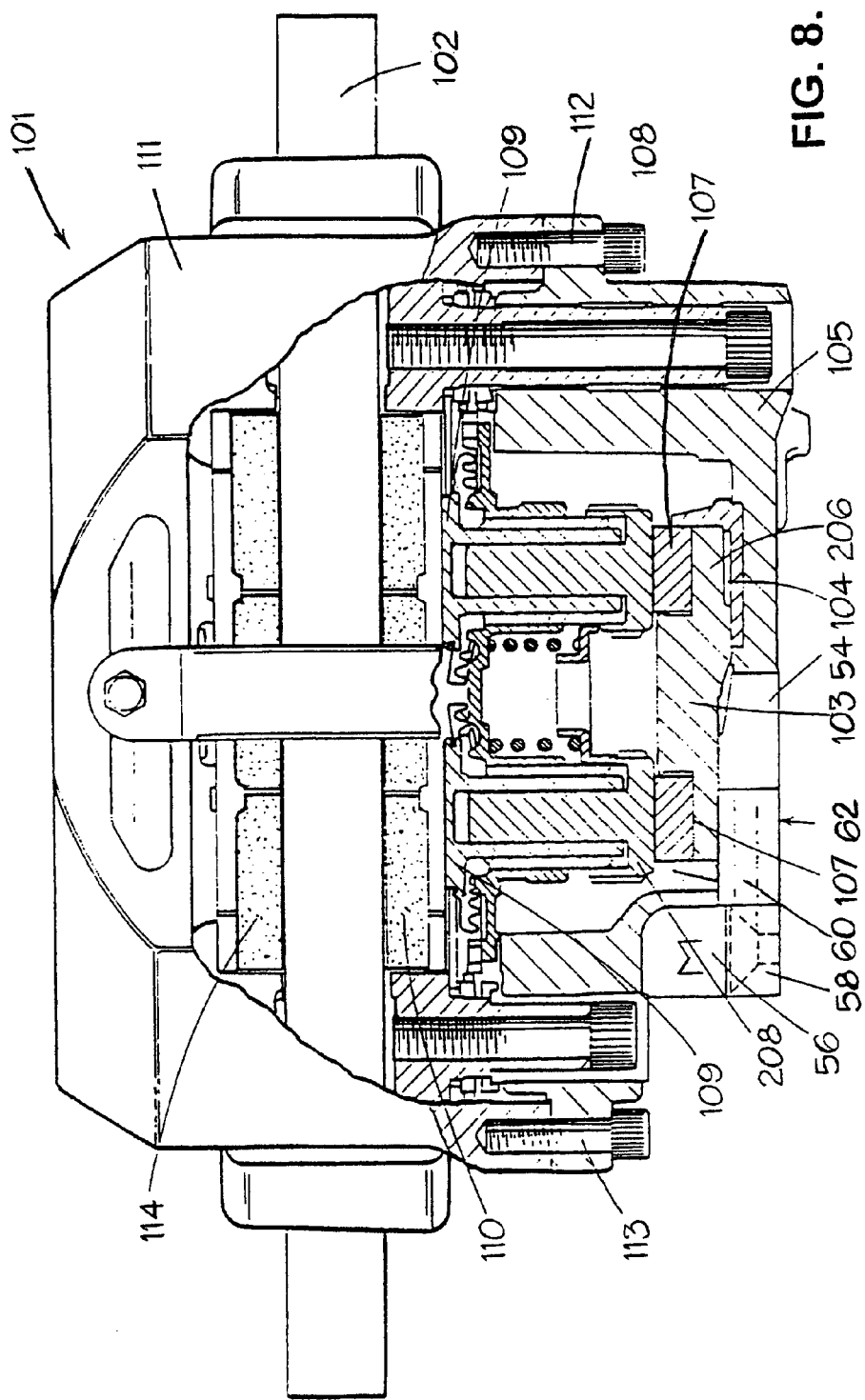
FIG. 8 is a sectional view through a braking device fitted with a variable latching device in accordance with the present invention.

FIG. 8 shows a preferred implementation where the cam member 50 of FIG. 7 has been replaced by a wedge 54 that is positioned through use of an electric motor 56, driving through a reduction gearbox 58 onto a lead screw 60 of a linear driver 62, which moves the wedge 54 linearly into and out of the desired park position. The use of a reduction gearbox 58 allows the further use of a low power motor having a compact layout suitable for mounting integrally with the brake. Additionally, the reduction gearbox and lead screw arrangement provide a non-reversible "detent" which holds the wedge 54 in position until further driven by the electric motor 56.

Figure 9:
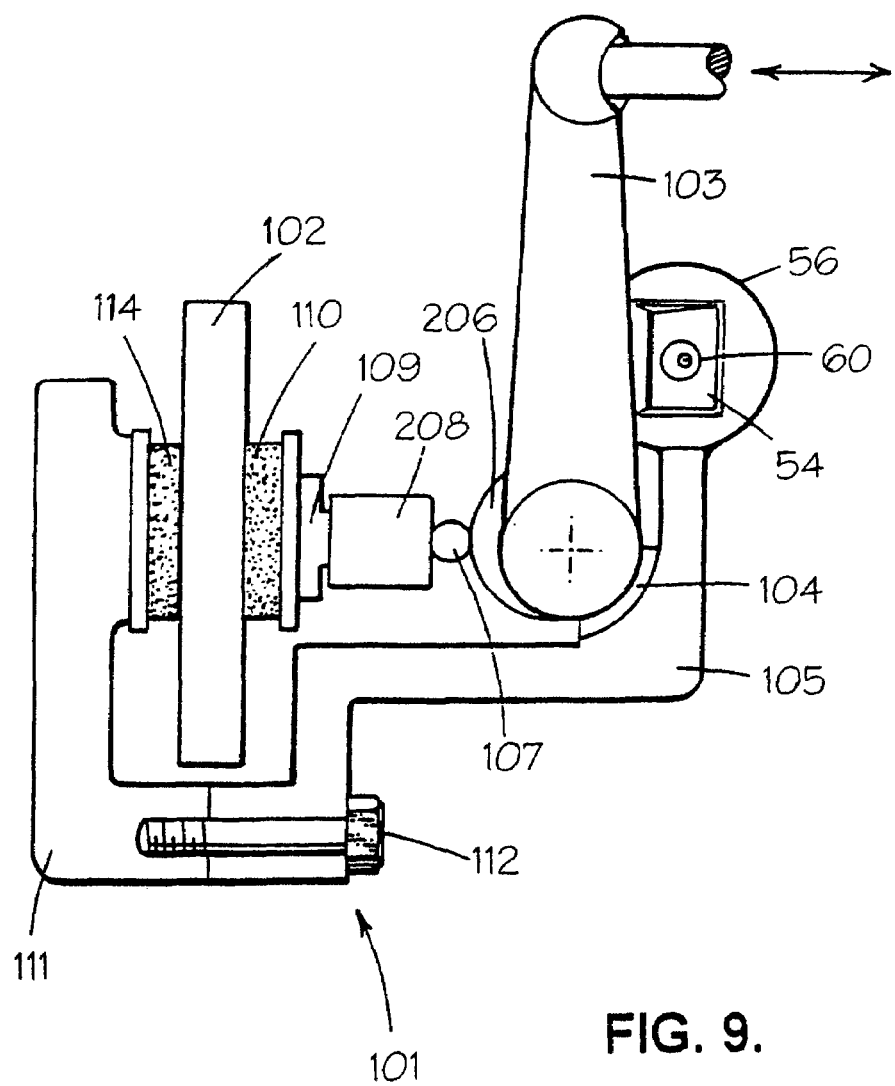
FIG. 9 illustrates the principle of operation of the latching device of FIG. 8.

FIG. 9 shows a simplified arrangement of the implementation shown in detail in FIG. 8 that has the motor-driven wedge 54. Corresponding parts in FIGS. 8 and 9 are numbered the same.

Although not really necessary to an understanding of the present invention, there follows a brief explanation of a disc brake structure of FIG. 8 to which the motor driven wedge 54 has been applied.

The disc brake of FIG. 8 comprises a housing 101 that straddles a disc 102 mounted on an axle of the vehicle to be braked (not shown). The brake is actuated by mechanical movement of an input actuator such as an air cylinder (not shown). Such actuators are well known in the field of brake actuation. The actuator co-operates with the outer end of the operation shaft or "op-shaft" 103 of the brake. The inner end of the op-shaft 103 is carried in a bearing attached to a lower or inner housing part 105. The inner end of the op-shaft 103 has formed on its outer surface a cam lobe 206 which upon rotation causes a reaction force to be transmitted to rollers 107. The rollers 107 in turn transmit the applied load to a pair of spaced inner tappet members 208. These inner tappet members 208, are screwed into engagement with associated outer tappet members 109 which apply the input load from the actuator to the rear of an inner brake lining 110, thus pressing the friction material of the inner brake lining 110 into frictional engagement with the disc 102. A reaction force is generated through this frictional engagement between the disc 102 and inner brake lining 110, that is fed back through the tappets 208 and 109, rollers 107 and cam lobe 206 which is supported by the inner housing part 105. The inner housing part 105 is secured to an outer housing part 111 by bridging bolts 112 and 113. Thus, the applied force being generated by movement of the op-shaft 103 is ultimately transmitted by reaction means to the outer housing part 111, which in turn presses an outer brake lining 114 into frictional engagement with the disc 102. Therefore it will be appreciated that the disc 102, upon movement of the op-shaft 103, is clamped between inner and outer brake linings 110 and 114 to generate a braking force for braking the vehicle under control of the applied input movement.

Figure 10:
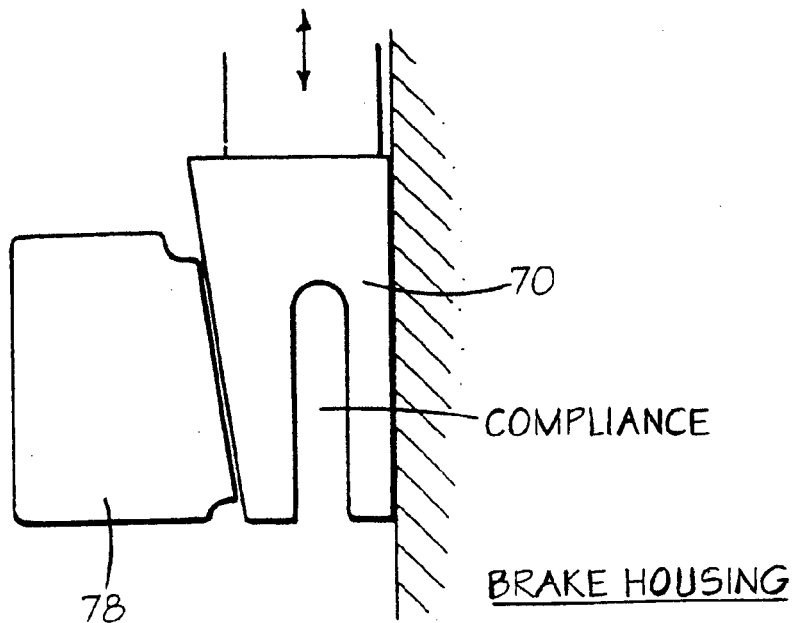
FIGS. 10 and 11 are diagrammatic illustrations of two further variable latching devices in accordance with this invention.
Figure 11:
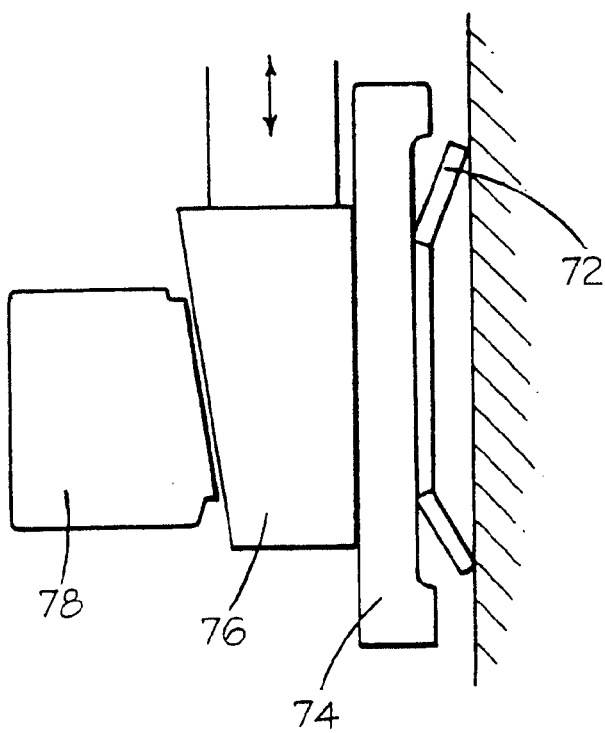

Reference is now made to FIGS. 10 and 11 which illustrates particular embodiments of the wedge version of the actuator wherein a means is included to enable an amount of mechanical compensation for dimensional changes within the brake during cooling. This is achieved by the inclusion of a stiff but compliant form within the wedge that is able to support the park load reaction from the op-shaft but which is capable of "following" the op-shaft as the brake relaxes so as to substantially maintain the force applied thereto.

The compliance may be built into the wedge itself or may indeed be built into the support for the wedge. As illustrated in FIG. 10, a wedge 70 is substantially of a "C" section in outline and formed in a material that, while compliant, is of relatively high stiffness. Thus, as the parking latching mechanism is engaged, an op-shaft 78 compresses the wedge 70 until a stable condition is achieved. As the brake cools, the brake dimensions alter which cause the op-shaft 78 to move substantially away from the wedge 70 but the wedge 70 is able to follow over at least a short operating range, holding the clamp load at substantially the applied load condition.

In the embodiment of FIG. 11, a support surface for a wedge 76 itself is formed from compliant means and has the same effect as in the embodiment of FIG. 10. In this case, the compliant means comprises a Belville spring 72 which urges a support 74 against the wedge 76. The op-shaft is shown at 78.

Figure 12:
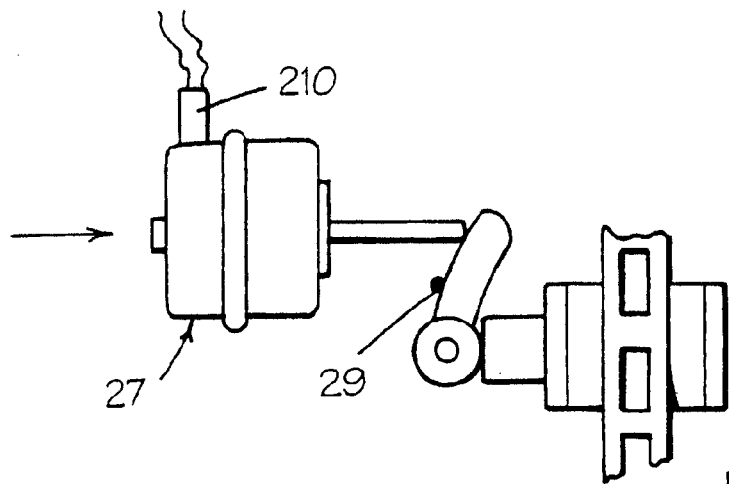
FIGS. 12, 13 and 14 illustrate diagrammatically various means of obtaining a feedback quality.
Figure 13:
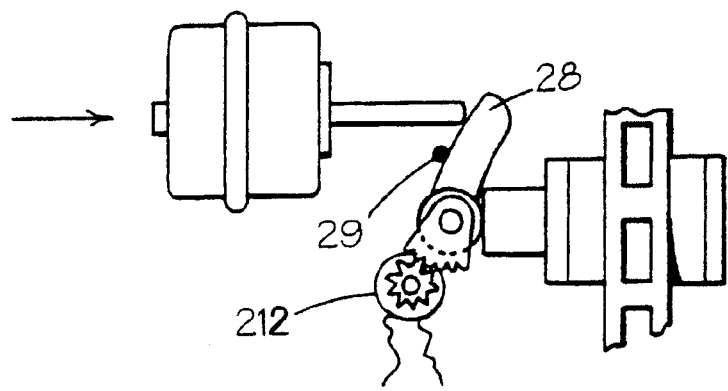
Figure 14:
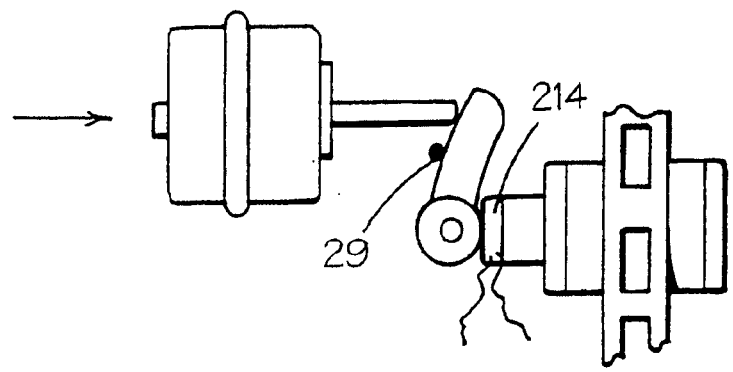

Reference is now directed to FIGS. 12 to 14 which show three possible ways of deriving a feedback signal/quantity corresponding to a sensed actuation level being exerted by the brake.

FIG. 12 shows the use of a pressure sensor 210 which provides an electrical output signal representative of the pressure developed inside the brake actuator 27 against the internal brake forces being developed within the brake.

FIG. 13 shows the use of an angular displacement sensor 212 which detects angular displacement of the op shaft or lever 28 within the brake actuation mechanism.

FIG. 14 shows the use of a force sensor 214, such as a load cell, for detecting the force developed inside the brake.

Figure 17:
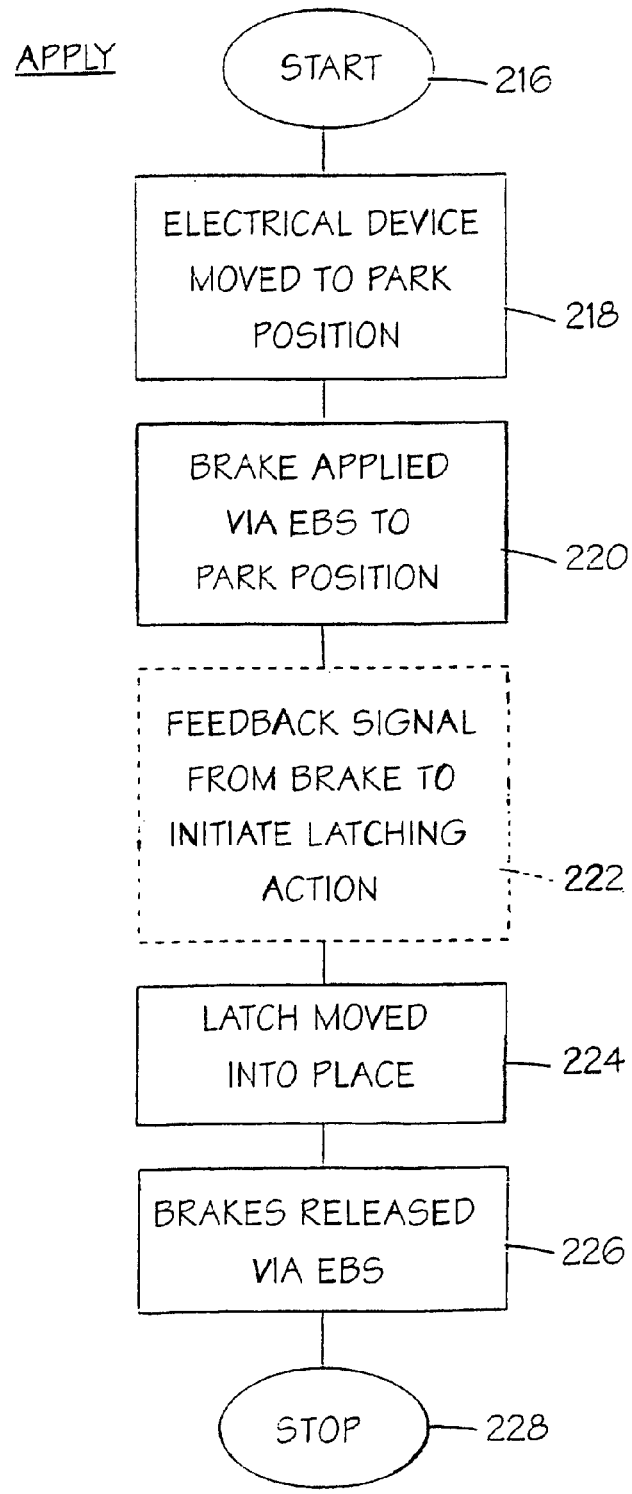
FIGS. 17 and 18 are flow diagrams illustrating possible sequences for the application and release of parking braking in a system in accordance with the present invention.

Reference is now made to FIG. 17 which is a simplified flow diagram showing the sequence steps in the parking brake application procedure. The individual boxes in FIG. 17 are as follows:

216—Start.
218—Electrical device (e.g. hand control 20) moved to park position.
220—Brake applied via EBS to parking level.
222—Feedback signal from brake to initiate latching action.
224—Latch moved into place.
226—Brakes released via EBS.
228—Stop.

Figure 18:
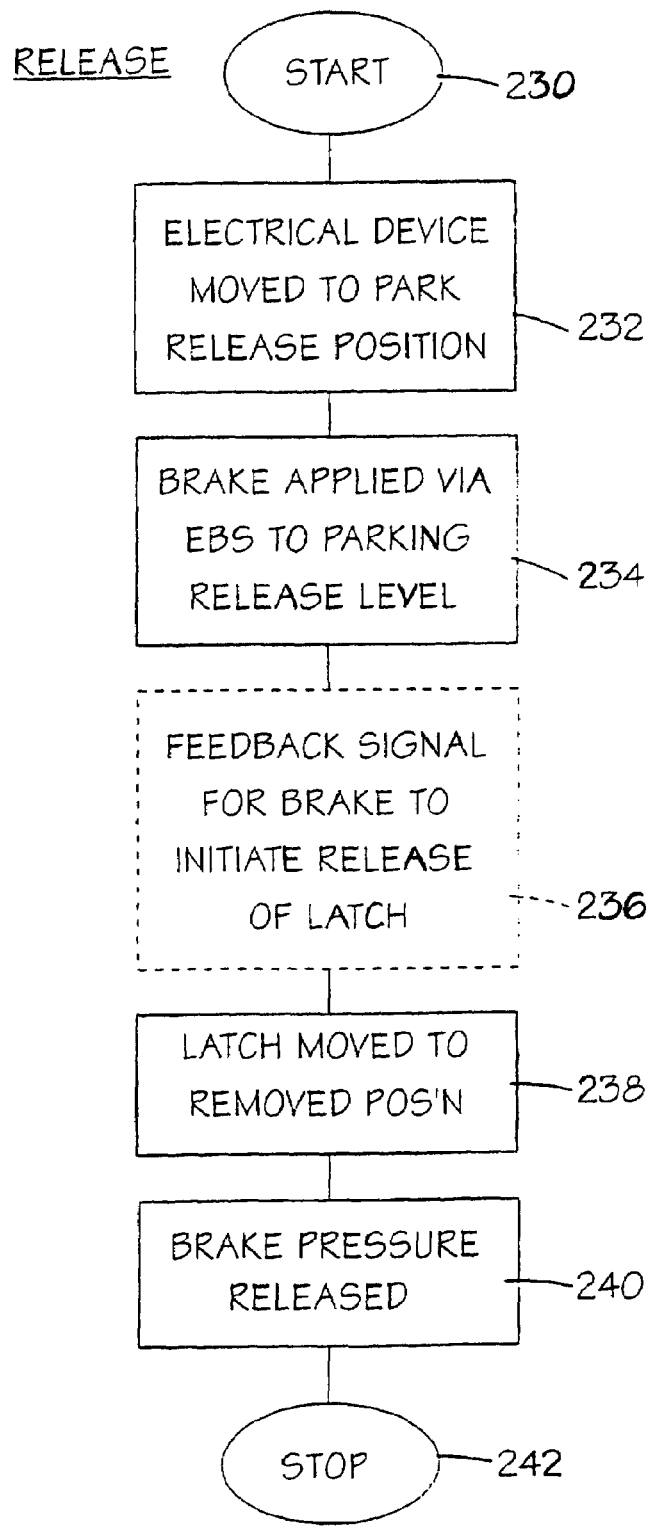

Reference is now made to FIG. 18 which is a simplified flow diagram showing the sequence steps in the parking brake release procedure. The individual boxes in FIG. 18 are as follows:

230—Start.
232—Electrical device moved to park release position.
234—Brake applied via EBS to park release level.
236—Feedback signal from brake to initiate release of latch.
238—Latch moved to removed position.
240—Brake pressure released.
242—Stop.

A parking system in accordance with the present invention can give one or more of the following benefits:

(1) Only single diaphragm actuators are required. The heavier and bulkier spring brake actuators are not required. This gives cost, weight and space benefits.
(2) On rigid non-towing vehicles, the parking reservoir is eliminated.
(3) The pneumatic hand control valve and associated piping is eliminated.
(4) If desired, four-wheel parking can give a higher level of parking effort than with conventional systems.
(5) There can be a saving in fitting labor at OEMs, due to the reduction in component parts and pipe work.
(6) The control of the braking through the hand control can be more accurate and responsive compared to conventional pneumatically released spring brakes, which tend to suffer from lags and high levels of hysteresis.
(7) The transducers in a graduated hand control are effectively used as demand sensors so that between the brakes off and park positions, the amount of braking can be varied. This is a feature of most of today's pneumatic hand controls. Alternatively, switches could be employed to provide a two-state system.

The invention claimed is:
1. A parking braking system for a vehicle having an electronic braking system as a primary mechanism for generating a parking braking force via pneumatic brake actuators controlled by a manually operated electrical device wherein vehicle brakes for non-parking braking are controlled by electronic signals generated at a foot-controlled brake pedal in response to a driver's braking demand, each pneumatic brake actuator having a piston that is adapted to rotate a pivoted lever to operate a respective brake by urging a displaceable brake piston to apply a pair of brake pads to opposite sides of a respective brake disc, and including an electronic controller adapted to control a supply of pressurized air to the pneumatic brake actuators in accordance with the electronic signals corresponding to the driver's braking demand, and wherein, upon selecting parking braking by actuation of the manually operated electrical device, the vehicle brakes are arranged to be applied and mechanically locked or latched into place with a stop device which, when actuated, is selectively displaceable by an actuator to engage with the pivoted lever to mechanically hold the vehicle brake in a selected parking braking condition, irrespective of whether a brake force generated via the electronic braking system is subsequently reduced, and wherein, following actuation of the manually operated electrical device, initiation of latching action is provided by a feedback quantity that is taken from a sensed actuation level exerted by the vehicle brake reaching a preset or controlled level.

2. The parking braking system as claimed in claim 1, wherein the manually operated electrical device is adapted to generate and transmit an electrical parking brake signal to a vehicle mounted electronic control unit and wherein the vehicle brakes are arranged to be mechanically locked or latched via the vehicle mounted electronic control unit in a brakes-applied condition in response to generation of the electrical parking brake signal.

3. The parking braking system as claimed in claim 2, wherein the vehicle mounted electronic control unit is a main vehicle electronic braking system electronic control unit.

4. The parking braking system as claimed in claim 2, wherein the vehicle mounted electronic control unit is separate from a main vehicle electronic braking system electronic control unit.

5. The parking braking system as claimed in claim 1, wherein the manually operated electrical device comprises a switch.

6. The parking braking system as claimed in claim 1, wherein the manually operated electrical device comprises a variable transducer.

7. The parking braking system as claimed in claim 6, wherein the variable transducer provides graduated braking between a brakes-off position and a park position.

8. The parking braking system as claimed in claim 1, wherein the pneumatic brake actuators are arranged to be released via the electronic braking system once the stop device has been actuated to hold the vehicle brakes in a brakes-applied condition.

9. The parking braking system as claimed in claim 1 wherein each of the pneumatic brake actuators provides both parking braking and non-parking braking actuation at each wheel on the vehicle.

10. The parking braking system as claimed in claim 1 wherein the feedback quantity is a pressure developed inside the pneumatic brake actuators against internal brake forces being developed within the vehicle brake.

11. The parking braking system as claimed in claim 1, wherein the feedback quantity is a displacement of a component within the vehicle brake.

12. The parking braking system as claimed in claim 1, wherein the feedback quantity is a force developed inside the vehicle brake that is measured by at least one sensor positioned to be subjected to at least one of actuation and clamping stresses within the vehicle brake.

13. The parking braking system as claimed in claim 1, wherein the stop device is a solenoid operated pin.

14. The parking braking system as claimed in claim 1, wherein the stop device comprises a pivotable latch which is selectively rotatable by an actuator for single position engagement with a brake operating input member to maintain the vehicle brake in a parking braking condition.

15. The parking braking system as claimed in claim 1, wherein the stop device is constructed to mechanically hold the vehicle brakes in any one of a plurality of park load levels.

16. The parking braking system as claimed in claim 15, wherein the stop device comprises a pivotable latch which is selectively rotatable by an actuator to any of a plurality of engagement positions with a brake operating input member to maintain the vehicle brake in a selected parking braking condition.

17. The parking braking system as claimed in claim 15, wherein the stop device comprises a rotatable cam which engages a brake operating input member to maintain the vehicle brake in a selected parking braking condition.

18. The parking braking system as claimed in claim 15, wherein the stop device comprises a wedge which is arranged to be selectively driven by a controlled actuator into engagement with a brake operating input member to maintain the vehicle brake in a selected parking braking condition.

19. The parking braking system as claimed in claim 18, wherein the controlled actuator is one of an air cylinder and an electric motor.

20. The parking braking system as claimed in claim 19, wherein the controlled actuator is an electric motor, and the wedge is coupled to the electric motor by way of a mechanism which is non-reversible except by reverse driving of the electric motor.

21. The parking braking system as claimed in claim 20, wherein the mechanism is a high reduction gearbox.

22. The parking braking arrangement as claimed in the claim 1 wherein the electronic braking system is arranged to re-apply a brake force up to a level at which the stop device can be released in order to enable parking braking to be released.

23. The parking brake arrangement as claimed in claim 1 wherein the electronic braking system is arranged to re-apply a brake force up to a level at which the stop device can be released in order to enable parking brake to be released.

24. The parking braking arrangement as claimed in claim 23, wherein, following selection of a parking braking release condition of the manually operated electrical device, initiation of release of latching action is dependent upon the feedback quantity.

25. The parking braking system as claimed in claim 1 wherein the pivoted lever has a first end that receives a brake apply force and a second end that cooperates with the displaceable brake piston.

26. The parking braking system as claimed in claim 25, wherein the pivoted lever pivots about the second end.

* * * * *

UNITED STATES PATENT AND TRADEMARK OFFICE
CERTIFICATE OF CORRECTION

PATENT NO. : 7,234,785 B1  Page 1 of 1
APPLICATION NO. : 09/647112
DATED : June 26, 2007
INVENTOR(S) : McCann et al.

It is certified that error appears in the above-identified patent and that said Letters Patent is hereby corrected as shown below:

On the Title Page:

The Assignee should read as follows:

(73) Assignee: Meritor Automotive, Inc., Troy, MI (US)

Signed and Sealed this

Nineteenth Day of August, 2008

JON W. DUDAS
*Director of the United States Patent and Trademark Office*